(12) United States Patent
Shirakawa et al.

(10) Patent No.: US 6,699,449 B2
(45) Date of Patent: Mar. 2, 2004

(54) METHOD OF SYNTHESIZING METAL OXIDES

(75) Inventors: Naoki Shirakawa, Tsukuba (JP); Shin-Ichi Ikeda, Tsukuba (JP); Hiroshi Bando, Tsukuba (JP)

(73) Assignee: Agency of Industrial Science & Technology, Ministry of International Trade & Industry, Tokyo (JP)

( * ) Notice: Subject to any disclaimer, the term of this patent is extended or adjusted under 35 U.S.C. 154(b) by 0 days.

(21) Appl. No.: 09/734,180

(22) Filed: Dec. 12, 2000

(65) Prior Publication Data

US 2002/0021998 A1 Feb. 21, 2002

(30) Foreign Application Priority Data

Feb. 4, 2000 (JP) ........................................ 2000-028089

(51) Int. Cl.[7] .......................... C01F 17/00; C01G 39/00; C01G 31/00; C01G 41/00; C01G 33/00
(52) U.S. Cl. ................. 423/263; 423/593.1; 423/594.8; 423/594.15; 423/594.16
(58) Field of Search ................................ 423/593, 263, 423/593.1, 594.16, 594.8, 594.15

(56) References Cited

U.S. PATENT DOCUMENTS 6,403,053 B1 * 6/2002 Fang et al.

FOREIGN PATENT DOCUMENTS

JP        04-305020        10/1992

OTHER PUBLICATIONS

Fotiev, et al., "Synthesis and study of solid solutions in strontium vanadate–strontium lanthanide vanadate systems," Zhurnal Neorganicheskoi Khimii, 1981, no month, 26(4), pp. 881–883.*

Vinogradov, et al., "Synthesis and structural characteristics of calcium molybdenum oxide," Doklady Akademii Nauk, 1991, no month, 320(6), pp. 1396–1399.*

U. Steiner, et al, "On the System Sr/Mo/O: Phase Diagram, Synthesis and Characterization of Ternary Compounds", 1998, pp. 110–116, no month.

Bo Lindblom, et al., "Solid State emf Measurements and Phase Studies in the System SrO/Mo/O in the Temperature Range 1200–1600 K", Department of Inorganic Chemistry, University of Umeá, pp. 452–458, 1986, no month.

* cited by examiner

Primary Examiner—Steven Bos
(74) Attorney, Agent, or Firm—Oblon, Spivak, McClelland Maier & Neustadt, P.C.

(57) ABSTRACT

This invention relates to a process for the production of an oxide of a metal A by heating precursors of the oxide of a metal A, in the presence of an oxygen partial pressure control agent comprising an oxide of a metal B that is capable of assuming multiple valence numbers. The process is carried out under a condition that an ionization tendency relationship of $A^{i+} < B^{j+} < A^0$ is satisfied, where i is a valence number of the metal A in the oxide to be produced and j is a valence number of the metal B in the oxygen partial pressure control agent.

9 Claims, 2 Drawing Sheets

METHOD OF SYNTHESIZING METAL OXIDES

BACKGROUND OF THE INVENTION

1. Field of the Invention

This invention relates to a method of synthesizing metal oxides usable as, for instance, superconductors, semiconductors, magnetic materials and catalysts.

2. Description of the Prior Art

It is known that synthesis of certain metal oxides requires the oxygen partial pressure to be controlled to an extremely low level. Regarding synthesis of $Sr_2MoO_4$, for example, Lindblom et al. estimated from the oxidation-reduction potential of the metal oxide that the oxygen partial pressure must be maintained at an extremely low $10^{-21}$ atm. [B. Linblom and R. Rosen, Acta Chem Scand. A40, 452 (1986)]. Since such an extremely low oxygen partial pressure could not be achieved with an ordinary vacuum pump, they adopted a method comprising the steps of placing a mixture of $Sr(OH)_2$ and $MoO_2$ as a starting material and a mixture of SrO and Mo metallic powders as an oxygen partial pressure buffer side by side in a vacuum vessel and heating the vacuum vessel. They succeeded in obtaining $Sr_2MoO_4$ by this method.

When the oxygen partial pressure is lowered too much, however, metals in the starting material precipitate as simple substances that constitute impurities. The foregoing prior art method of controlling oxygen partial pressure with a mixture of SrO and Mo metallic powders therefore has a major drawback in that precipitation of Mo metal, $Sr_3Mo_2O_7$ and other impurity phases on the starting material side makes production of a single-phase material impossible [U. Steiner and W. Reichelt, Z. Naturforsch. 53b, 110 (1998)].

An object of the present invention is to provide a method of synthesizing metal oxides that utilize a rationally selected oxygen partial pressure control agent to achieve oxygen partial pressure control even in an extremely low oxygen partial pressure region of $10^{-21}$ atm. and thus to enable synthesis of a target metal oxide without precipitation of simple metal as impurity on the starting material side.

SUMMARY OF THE INVENTION

The present invention achieves this object by providing a method of synthesizing metal oxides that, when synthesizing an oxide of a metal A, controls oxygen partial pressure by using an oxygen partial pressure control agent containing an oxide of a metal B capable of assuming multiple valence numbers, which method satisfies an ionization tendency relationship of $A^{1+}<B^{j+}<A^0$, where i is a valence number of the metal A and j is a valence number of the metal B.

An example of synthesizing $Sr_2MoO_4$ using $Ti_2O_3$ as the oxygen partial pressure control agent will be described. In this case, metal A=Mo, metal B=Ti, and the $Ti^{3+}$ ($B^{j+}$) ions in the oxygen partial pressure control agent $Ti_2O_3$ have an ionization tendency just midway between the $Mo^{4+}$ ($A^{1+}$) ions as in $Sr_2MoO_4$ and Mo ($A^0$) simple metal, that is, the relationship of $Mo^{4+}<Ti^{3+}<Mo$ holds. The first half of the relation, $Mo^{4+}<Ti^{3+}$, ensures that residual oxygen gas in the vacuum vessel is absorbed by $Ti_2O_3$ to produce the extremely low oxygen partial pressure of $10^{-21}$ atm. necessary for $Sr_2MoO_4$ formation. At the same time, no liberation of Mo metal occurs since $Ti^{3+}<Mo$. Pure $Sr_2MoO_4$ can therefore be synthesized.

The above and other objects and features of the invention will become apparent from the description made with reference to the accompanying drawings.

DESCRIPTION OF THE PREFERRED EMBODIMENT

The invention will now be specifically explained taking synthesis of $Sr_2MoO_4$ as an example.

Figure 1:
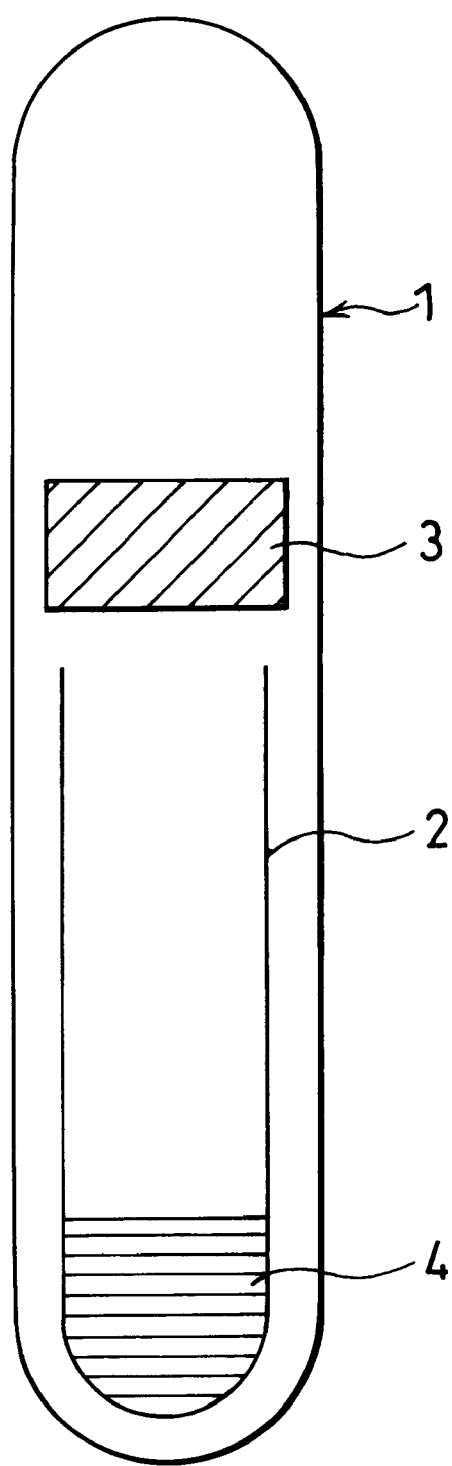
FIG. 1 is a schematic view for explaining synthesis of a metallic oxide by the method of the present invention.

As shown in FIG. 1, $Ti_2O_3$ (used as oxygen partial pressure control agent 4) was placed in a quartz vessel 2 (open-mouthed test tube) accommodated in a quartz tube 1. Starting material 3 prepared by compression-molding a thoroughly blended mixture of $Sr_3MoO_6$ powder and metallic Mo powder at a molar ratio of 2:1 was placed in the quartz tube 1 and the quartz tube 1 was vacuumized to around $5\times10^{-8}$ atm. This degree of pressure reduction could be achieved with a general-purpose vacuum pump, without need for any special equipment. Argon gas was sucked into the quartz tube 1 to establish a pressure of 0.21 atm., and the tube was sealed by fusing its opening shut. The optimal molar ratio between $Ti_2O_3$ and $Sr_2MoO_4$ turned out 3:4 after several trial runs.

The sealed quartz tube 1 was placed in an electric furnace and the material therein was sintered at 1,150° C. for 1 week to synthesize $Sr_2MoO_4$, the target substance. $Sr_2MoO_4$ was identified by the X-ray powder diffraction method. The X-ray powder diffraction pattern of the obtained $Sr_2MoO_4$, is shown in FIG. 2.

Figure 2:
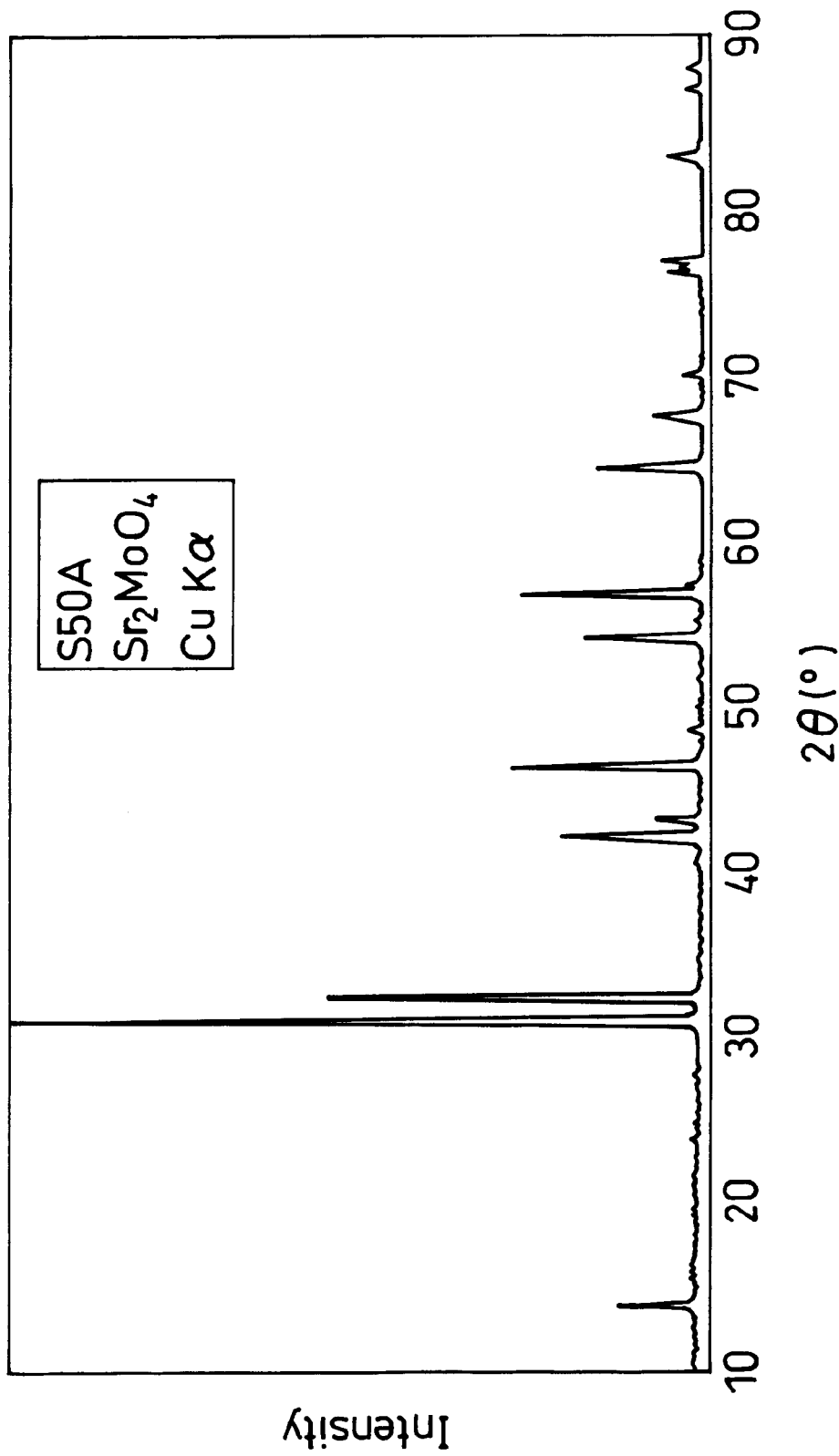
FIG. 2 is a diagram showing the X-ray powder diffraction pattern of $Sr_2MoO_4$ obtained by the synthesis method of the present invention.

The X-ray powder diffraction pattern of FIG. 2 agrees with the pattern for $Sr_2MoO_4$ published by the International Center for Diffraction Data.

Unlike the prior art techniques, the present invention does not use a simple metal such as Mo, Ti, Ta or Zr as a getter but, as in this embodiment, uses an oxide such as $Ti_2O_3$ as an oxygen partial pressure control agent. Since the $Ti^{3+}$ ions in $Ti_2O_3$ has an ionization tendency falling just midway between $Mo^{4+}$ ions and Mo simple metal, they act as a weak reducing agent with respect to $Sr_2MoO_4$ containing $Mo^{4+}$ ions, lest residual oxygen gas in the quartz tube 1 should be absorbed by the synthesized $Sr_2MoO_4$ and make $Sr_2MoO_4$ unstable. On the other hand, the ionization tendency of $Ti^{3+}$ ions is weaker than that of Mo simple metal. There is, therefore, no occurrence of a chemical reaction causing $Sr_2MoO_4$ to be excessively reduced to precipitate Mo metal. $Sr_2MoO_4$ is therefore stably produced under an equilibrium state to afford a product unadulterated by impurities.

In contrast, when Ti or other metal known as a getter is used to absorb oxygen gas, the ionization tendency becomes $Mo^{4+}<Mo<Ti$. A pure product therefore cannot be obtained because Mo simple metal and other impurities are invariably precipitated owing to the strong reducing action on $Sr_2MoO_4$.

The present invention can be widely applied in cases where the oxide of metal A to be synthesized can be synthesized only at an oxygen partial pressure lower than that achievable with a vacuum pump. Oxides of metal A meeting this description include, in addition to $Sr_2MoO_4$, $SrMoO_3$, $Sr_3Mo_2O_7$, $CaMoO_3$, $BaMoO_3$, $Y_{1-x-y}Nd_xEU_yMo_2O_7$ ($0\leq x, y\leq 1$), $NaWO_3$, $Sr_2VO_4$, $Sr_2NbO_4$ and $Sr_{0.86}NbO_3$. Other oxides that can be produced by the invention include $Sr_3V_2O_7$, $Sr_4V_3O_{10}$, $La_2Mo_2O_7$, $LaMo_5O_8$, $La_4MoO_8$, $La_2MoO_5$, $LaMo_2O_5$, $LaMo_{7.7}O_{14}$, $La_5Mo_{32}O_{54}$ and $CaTi_2O_4$.

Among these metallic oxides, $Sr_2NbO_4$ is useful as superconducting material, while $Sr_2MoO_4$, $SrMoO_3$, $CaMoO_3$, $BaMoO_3$ and others are useful as electrode material for LSIs and substrate material for superconducting oxide deposition. $NaWO_3$ is useful as a catalyst, $Sr_2VO_4$ as magnetic material, and $Y_{1-x-y}Nd_xEu_yMo_2O_7$ ($0 \leq x$, $y \leq 1$) and $Sr_{0.86}NbO_3$ as optical materials.

The oxide of metal B used as the oxygen partial pressure control agent can be any of various metal oxides whose metal B can assume multiple valence numbers, which contain metal B at a valence number j smaller than its maximum valence number k (j<k), and which satisfy the ionization tendency relationship of $A^{1+} < B^{j+} < A^0$, where i is the valence number of metal A in the target metal oxide.

When $Sr_2MoO_4$ is synthesized, therefore, the oxygen partial pressure control agent is not limited to $Ti_2O_3$ ($B^{j+} = Ti^{3+}$) but can instead be any of various others such as $V_2O_3$ ($B^{j+} = V^{3+}$), $VO_2$ ($B^{j+} = V^{4+}$), $Nb_2O_3$ ($B^{j+} = Nb^{3+}$) and $NbO_2$ ($B^{j+} = Nb^{4+}$).

In the synthesis of $Sr_2MoO_4$ described above, the amount of $Ti_2O_3$ used as the oxygen partial pressure control agent was approximately the same as the theoretical amount of $Sr_2MoO_4$ expected for the synthesis (molar ratio of 3:4). It was known that the oxygen partial pressure in the sealed tube would be eventually determined by a tug-of-war between the $A^{1+}$ ($Mo^{4+}$) ions and the $B^{j+}$ ($Ti^{3+}$) ions and, therefore, that the amounts of the two types of ions would have to be adjusted for the oxide to be synthesized. Experimental results showed a ratio of 3:4 to be optimum.

In the synthesis method of the present invention, the oxide of metal A to be synthesized is the first to be decided. The oxide of metal B to be used as the oxygen partial pressure control agent is next selected in the foregoing manner, and finally their molar ratio is decided accordingly. The selection of the oxide of metal A automatically determines the temperature and proper oxygen partial pressure during synthesis. Starting from 1:1, the molar ratio of the target oxide of A to the oxide of B should be adjusted to realize this proper oxygen partial pressure. This is done through examining the final product by X-ray powder diffraction.

The foregoing synthesis of $Sr_2MoO_4$ was carried out using $Sr_3MoO_6$ powder and metallic Mo powder as starting materials at a molar ratio of 2:1. However, the invention is not limited to this and selection can be made based on the theoretical molar ratio of the elements constituting the oxide of metal A to be synthesized. For example, a starting material composed of SrO and $MoO_2$ mixed at a molar ratio of 2:1 can be used.

Although the foregoing synthesis of $Sr_2MoO_4$ was carried out using $Sr_3MoO_6$ powder and metallic Mo powder that had been compression-molded, the compression-molded starting material was used only to facilitate analysis after synthesis and is not essential. Although argon gas was used for synthesis of $Sr_2MoO_4$, it is also possible to charge the reaction vessel with some other inert gas or to leave it in a vacuumized state.

Fine adjustment of the oxygen partial pressure can be achieved by maintaining the material for synthesizing a target oxide (starting material) and the oxygen partial pressure control agent at different temperatures.

Specifically, in place of adjusting the molar ratio of the starting material and the oxygen partial pressure control agent to establish the oxygen partial pressure at which the oxide to be synthesized remains most stable, it is possible to lower (raise) the oxygen partial pressure by increasing (decreasing) the temperature of only the oxygen partial pressure control agent.

When a low oxygen partial pressure must be appropriately controlled in large-scale industrial production, there can be adopted a method that utilizes as an oxygen partial pressure control agent an oxide of a metal other than one contained in the foregoing starting material.

One such method would be to place a starting oxide material and an oxygen partial pressure control agent in separate industrial size heat-resisting vessels, place these in a large metal vessel, charge an inert gas such as argon into the outer metal vessel, and heat the starting oxide material and the oxygen partial pressure control agent with separate heaters to react the starting oxide material and synthesize a target substance.

The present invention has been described with reference to a specific embodiment. However, it should be noted that the invention is in no way limited to this embodiment and changes and modifications may be made without departing from the scope of the appended claims.

As explained in the foregoing, the method of synthesizing metal oxides according to the present invention enables previously impossible simple synthesis of single phase $Sr_2MoO_4$ and other oxides containing metals such as Mo, W, V and Nb without use of special equipment and without precipitation of impurity phases. Since the invention provides a technology for precisely controlling low oxygen partial pressures unachievable with a vacuum pump, it can be applied for synthesizing various polycrystalline and monocrystalline oxides that require an extremely low oxygen partial pressure during synthesis.

What is claimed is:

1. A process for the production of an oxide of a metal A, comprising:

heating starting materials of the oxide of a metal A, in the presence of an oxygen partial pressure control agent comprising an oxide of a metal B wherein said metal B is capable of assuming multiple valence numbers, thereby producing the oxide of metal A; and wherein said heating is carried out under a condition that an ionization tendency relationship of $A^{i+} < B^{j+} < A^0$ is satisfied, wherein i is a valence number of the metal A in the oxide to be produced and j is a valence number of the metal B in the oxygen partial pressure control agent;

said oxide of metal B is at least one member selected from the group consisting of $Ti_2O_3$, $V_2O_3$, $VO_2$, $Nb_2O_3$, and $NbO_2$; and said oxide of metal A is at least one member selected from the group consisting of $SrMoO_3$, $Sr_2MoO_4$, $Sr_3Mo_2O_7$, $CaMoO_3$, $BaMoO_3$, $Y_{1-x-y}Nd_xEu_yMo_2O_7$, $NaWO_3$, $Sr_2VO_4$, $Sr_2NbO_4$, and $Sr_{0.86}NbO_3$, wherein $0 \leq x$, $y \leq 1$.

2. The process according to claim 1, wherein the molar ratio of the oxide of metal A to the oxide of metal B is 4:3.

3. The process according to claim 1, wherein the molar ratio of the oxide of metal A to the oxide of metal B is from 1:1 to 4:3.

4. The process according to claim 1, wherein said heating occurs in the presence of an inert gas.

5. The process according to claim 1, wherein said heating occurs in a vacuum.

6. The process according to claim 1, wherein said metal oxide is a polycrystalline oxide.

7. The process according to claim 1, wherein the metal oxide is a monocrystalline oxide.

8. The process according to claim 1, wherein said heating is performed at a temperature of 1,150° C.

9. The process according to claim 1, wherein said heating is performed for one week.

* * * * *